(12) United States Patent
Lee et al.

(10) Patent No.: US 11,805,325 B2
(45) Date of Patent: Oct. 31, 2023

(54) IMAGE SENSING DEVICE CORRECTING DEFECTIVE IMAGE VALUES

(71) Applicant: SK hynix Inc., Gyeonggi-do (KR)

(72) Inventors: Kyung Ho Lee, Gyeonggi-do (KR);
Jae Hun Jang, Gyeonggi-do (KR);
Kyoung Mook Lim, Gyeonggi-do (KR); Cheol Jon Jang, Gyeonggi-do (KR); Keun Soo Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 71 days.

(21) Appl. No.: 17/494,371

(22) Filed: Oct. 5, 2021

(65) Prior Publication Data
US 2022/0311934 A1 Sep. 29, 2022

(30) Foreign Application Priority Data
Mar. 25, 2021 (KR) ........................ 10-2021-0038902

(51) Int. Cl.
*H04N 23/80* (2023.01)
*G06T 7/33* (2017.01)
*G06T 5/00* (2006.01)
*G06T 7/00* (2017.01)

(52) U.S. Cl.
CPC ............ *H04N 23/80* (2023.01); *G06T 5/001* (2013.01); *G06T 7/0002* (2013.01); *G06T 7/337* (2017.01); *G06T 2207/20172* (2013.01)

(58) Field of Classification Search
CPC ...... H04N 23/80; H04N 23/84; H04N 25/134; H04N 25/63; H04N 25/683; H04N 23/672; H04N 17/002; G06T 5/001; G06T 7/0002; G06T 7/337; G06T 2207/20172; G06T 2207/30168; G06T 7/0004
See application file for complete search history.

(56) References Cited

U.S. PATENT DOCUMENTS

| 8,497,922 | B2 * | 7/2013 | Kadohara | ............... | H04N 5/772 348/247 |
| 2010/0073526 | A1 * | 3/2010 | Watanabe | ............... | H04N 25/68 348/E9.037 |
| 2011/0102650 | A1 * | 5/2011 | Shoyama | ............... | H04N 25/75 348/247 |
| 2011/0149123 | A1 * | 6/2011 | Matsuoka | ............... | H04N 25/68 348/E9.037 |
| 2020/0045256 | A1 * | 2/2020 | Hosono | ................... | H04N 23/84 |

FOREIGN PATENT DOCUMENTS

| KR | 100237398 B1 | 1/2000 |
| KR | 1020140058738 A | 5/2014 |

* cited by examiner

*Primary Examiner* — Gevell V Selby
(74) *Attorney, Agent, or Firm* — IP & T GROUP LLP

(57) ABSTRACT

Disclosed is an image sensing device including a plurality of defect detectors each suitable for detecting whether a corresponding target image value is defective, and generating detection information corresponding to a result of the detection, a defect scheduler suitable for sequentially outputting one or more defective image values, which are the target image values detected as defective among the plurality of target image values, based on the detection information, and a defect corrector suitable for correcting the output defective image values.

15 Claims, 14 Drawing Sheets

IMAGE SENSING DEVICE CORRECTING DEFECTIVE IMAGE VALUES

CROSS-REFERENCE TO RELATED APPLICATION(S)

This application claims priority under 35 U.S.C. § 119 to Korean Patent Application No. 10-2021-0038902, filed on Mar. 25, 2021, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device that may control processing scheduling of defective image values.

In accordance with an embodiment of the present disclosure, an image sensing device may include: a plurality of defect detectors suitable for detecting whether a plurality of target image values are each defective, and generating a plurality of detection information corresponding to the detection results; a defect scheduler suitable for sequentially outputting one or more defective image values in which a defect occurs among the plurality of target image values, based on the plurality of detection information; and a defect corrector suitable for correcting the one or more defective image values.

The defect scheduler may sequentially output the defective image values by: determining priorities based on the detection information, and sequentially selecting the defective image values according to the priorities.

The detection information may include a flag signal indicating whether the corresponding target image value is defective, and a distortion value of the corresponding target image value.

The distortion value may be a sum of differences between the corresponding target image value and peripheral image values of the corresponding target image value.

In accordance with an embodiment of the present disclosure, an image sensing device may include: a plurality of defect detectors suitable for detecting whether a plurality of target image values are each defective, and generating a plurality of detection information corresponding to the detection results; a priority controller suitable for determining priorities of one or more defective image values and generating a plurality of control signals corresponding to the priorities, based on the plurality of detection information; an output unit suitable for sequentially outputting the one or more defective image values according to the priorities based on the plurality of control signals; and a defect corrector suitable for correcting the one or more defective image values.

The detection information may include a flag signal indicating whether the corresponding target image value is defective, and a distortion value of the corresponding target image value.

The distortion value may be a sum of differences between the corresponding target image value and peripheral image values of the corresponding target image value.

The output unit may include: a plurality of selection circuits suitable for selecting the defective image values according to the priorities; and at least one buffer circuit suitable for storing at least one defective image value having a second priority or lower among the defective image values.

In accordance with an embodiment of the present disclosure, an image sensing device may include: an image sensor including a plurality of pixels arranged at intersections of a plurality of rows and a plurality of columns, and suitable for generating target image values corresponding to pixel signals which are read out from the plurality of pixels; and an image processor suitable for dividing the target image values into a plurality of groups, and sequentially correcting one or more defective image values among the target image values for each group.

The image processor may sequentially select the defective image values according to priorities.

The image processor may be further suitable for determining the priorities according to distortion values corresponding to the respective defective image values.

Each of the plurality of distortion values may be a sum of differences between a corresponding defective image value and peripheral image values of the corresponding defective image value.

The image processor may sequentially select the one or more defective image values according to priorities.

The priorities may be determined according to distortion values corresponding to the defective image values, respectively.

Each of the plurality of distortion values may be a sum of difference values between a corresponding target image value and peripheral image values of the corresponding target image value.

In accordance with an embodiment of the present disclosure, an operating method of an image sensing device may include: receiving, at each clock, a group of kernel image values each including a target image value and peripheral image values; calculating, for each of the kernel image values, a distortion degree based on the target image value and the peripheral image values; detecting, for each of the kernel image values, the target image value as a defective image value based on the distortion degree; queueing in the one or more kernel image values having the defective image values within the group in a descending order of the distortion degree; and queueing out the queued-in kernel image values on a first-in-first-out (FIFO) basis to correct the defective image values within the group in the descending order.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

Throughout the specification, it will be understood that when an element is referred to as being "connected to" or "coupled to" another dement, the element may be directly connected to or coupled to another dement, or electrically connected to or coupled to another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural, FIG. 1 is a block diagram illustrating an image sensing device 10 in accordance with an embodiment of the present disclosure.

Figure 1:
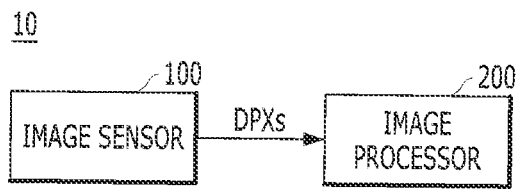
FIG. 1 is a block diagram illustrating an image sensing device in accordance with an embodiment of the present disclosure.

Referring to FIG. 1, the image sensing device 10 may include an image sensor 100 and an image processor 200.

The image sensor 100 may generate image values DPXs corresponding to a captured image.

The image processor 200 may process the image values DPXs.

Figure 7:
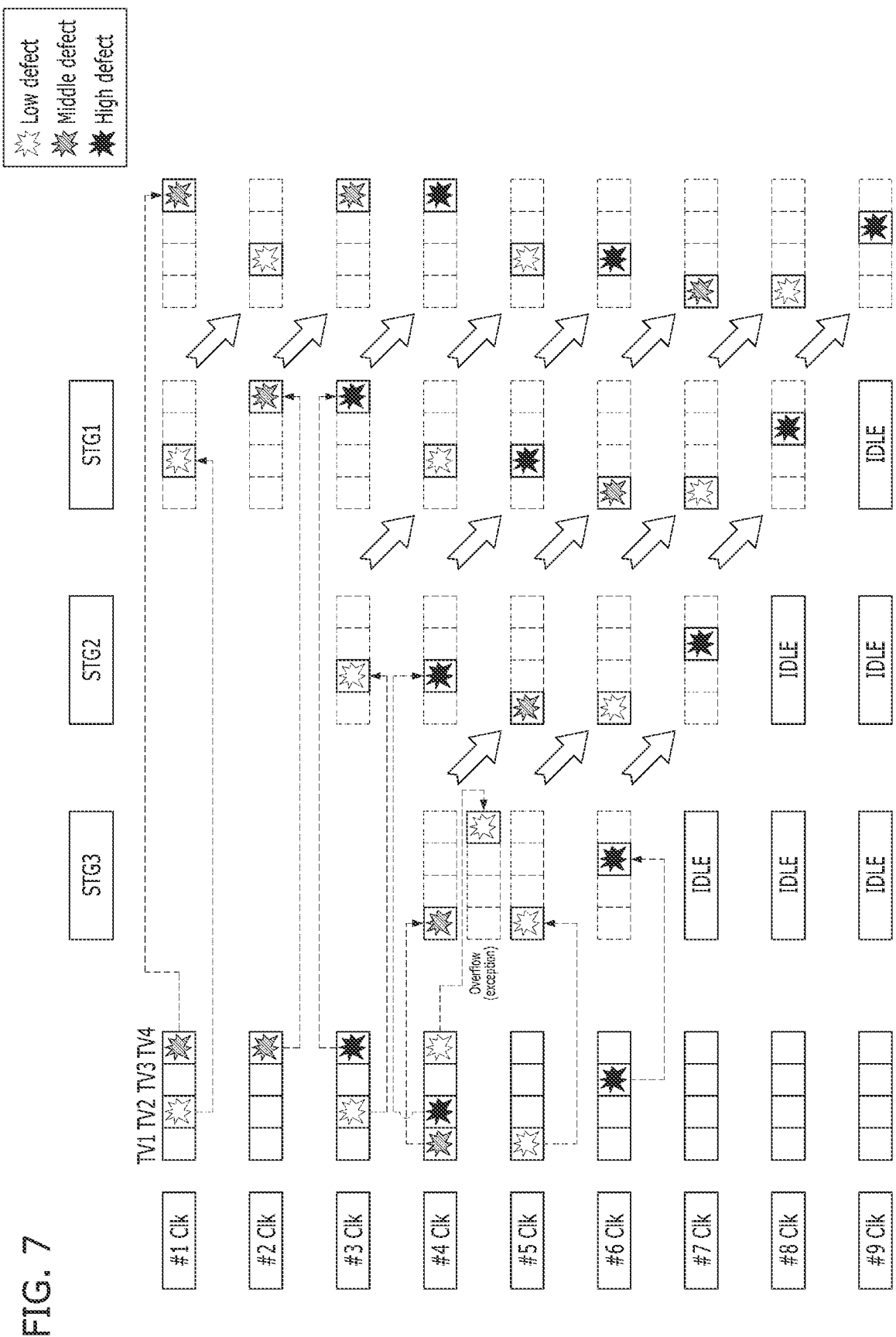
FIG. 7 is a diagram illustrating an operation of the image sensing device illustrated in FIG. 1, in accordance with an embodiment of the present disclosure.

For example, the image processor 200 may divide the image values DPXs into a plurality of groups (refer to the periodically provided groups of image values TV1, TV2, TV3 and TV4 illustrated in FIG. 7), and sequentially correct one or more defective image values among the image values for each group. The image processor 200 may sequentially select the one or more defective image values according to priorities. The priority may be determined according to each distortion value corresponding to each defective image value (refer to FIG. 7). For example, the image processor 200 may provide an output circuit 223 (refer to FIG. 5) which is optimally designed based on a probability of occurrence of a defective image value, thereby minimizing a circuit area. In addition, since the image processor 200 may perform time-sharing processing using buffer circuits STG1, STG2 and STG3 (refer to FIGS. 5 and 7 to 16) serving as a first-in-first-out (FIFO) based queue, it is possible to reduce the amount of processing required when correcting the defective image value.

Figure 2:
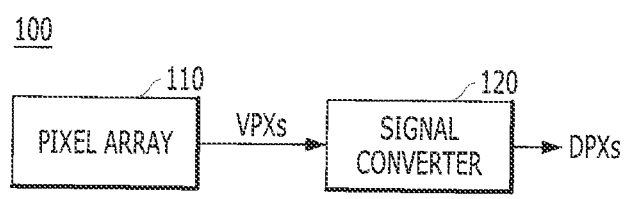
FIG. 2 is a block diagram illustrating an image sensor illustrated in FIG. 1, in accordance with an embodiment of the present disclosure.

FIG. 2 is a block diagram illustrating the image sensor 100 illustrated in FIG. 1, in accordance with an embodiment of the present disclosure.

Referring to FIG. 2, the image sensor 100 may include a pixel array 110 and a signal converter 120.

Figure 3:
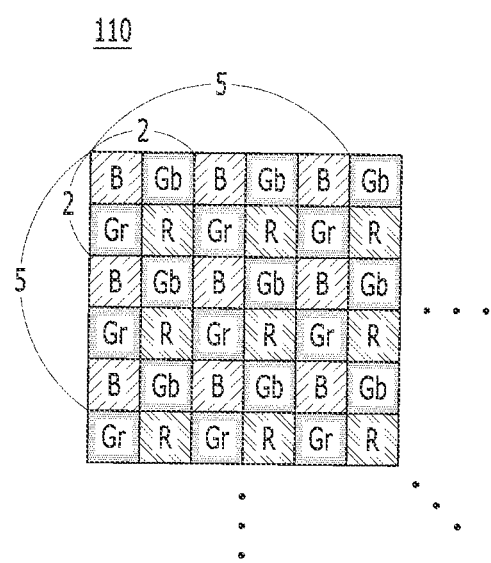
FIG. 3 is a diagram illustrating an example of a pixel array illustrated in FIG. 2, in accordance with an embodiment of the present disclosure.

The pixel array 110 may include a plurality of pixels (refer to FIG. 3). The pixel array 110 may generate pixel signals VPXs for each row. For example, the pixel array 100 may generate the pixel signals VPXs from pixels arranged in a first row during a first row time, and generate the pixel signals VPXs from pixels arranged in an $n^{th}$ row during an $n^{th}$ row time, where "n" is an integer greater than 2. Each of the pixel signals VPXs may be an analog-typed pixel signal.

The signal converter 120 may convert the analog-typed pixel signals VPXs into digital-typed image values DPXs. For example, the signal converter 120 may include an analog to digital converter.

FIG. 3 is a diagram illustrating an example of the pixel array 110 illustrated in FIG. 2, in accordance with an embodiment of the present disclosure.

Referring to FIG. 3, the pixel array 110 may include the plurality of pixels arranged at intersections of a plurality of rows and a plurality of columns. The plurality of pixels may be arranged in a predetermined pattern. For example, the plurality of pixels may be arranged in a Bayer pattern. The Bayer pattern may be composed of repeating cells each having 2×2 pixels. In each of the cells, two pixels Gb and Gr each having a green color filter may be disposed to diagonally face each other at corners thereof, and a pixel B having a blue color filter and a pixel R having a red color filter may be disposed at the other corners thereof. The four pixels B, Gb, Gr and R are not necessarily limited to the arrangement structure illustrated in FIG. 3, but may be variously disposed based on the Bayer pattern described above.

The image values DPXs may be used by the image processor 200 in units of "n"×"n" pixels, where "n" is a natural number. Hereinafter, an example in which the image values DPXs are generated in units of 5×5 pixels, and image values corresponding to the 5×5 pixels are referred to as a kernel image value is described. A kernel image value may include a target image value and peripheral image values. A target image value may be an image value corresponding to a centrally disposed pixel within the "5"×"5" pixels. Peripheral image values may be image values corresponding to pixels, which are disposed on the periphery of the centrally disposed pixel within the "5"×"5" pixels and have the same color filter as the centrally disposed pixel.

Figure 4:
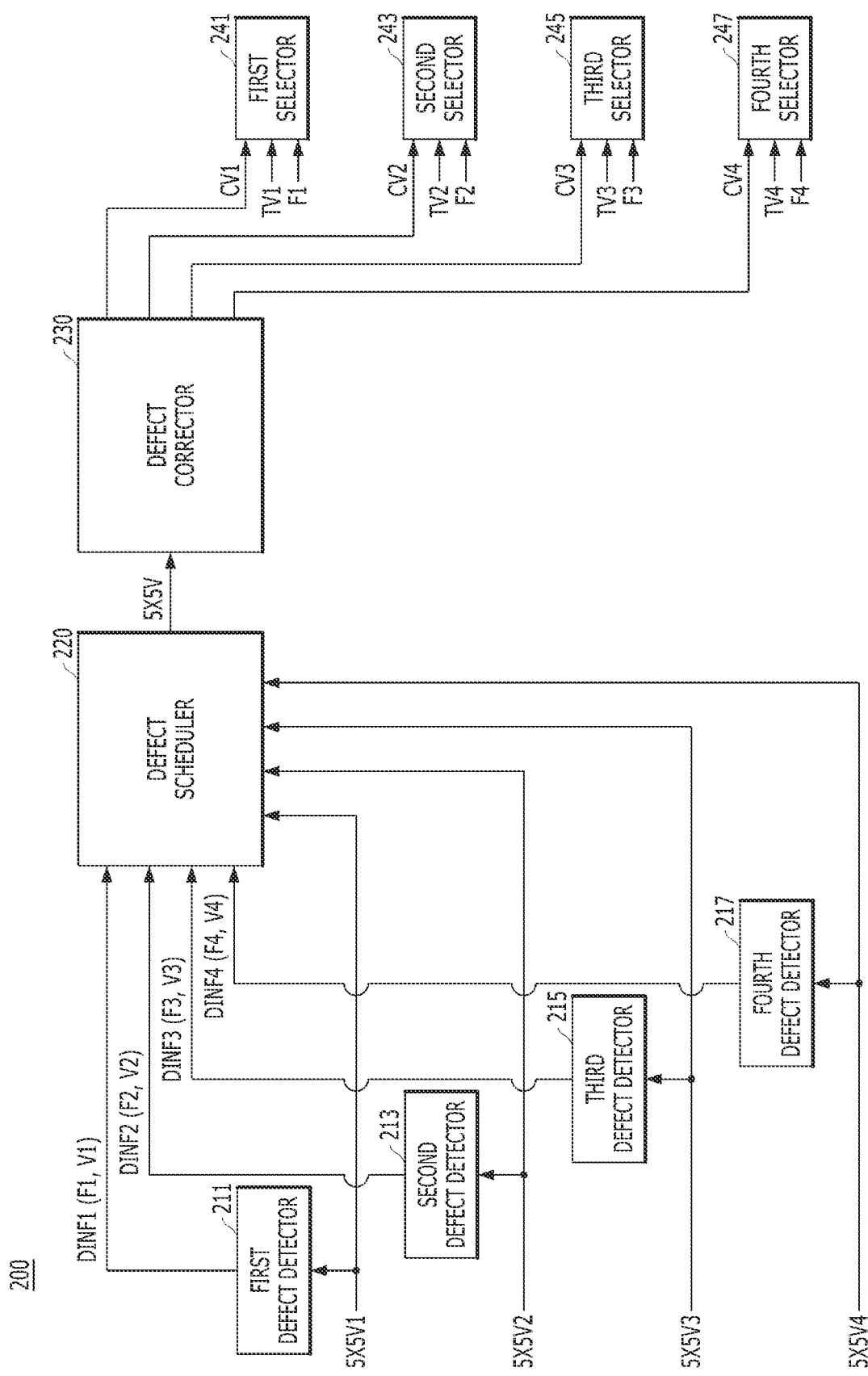
FIG. 4 is a block diagram illustrating an image processor illustrated in FIG. 1, in accordance with an embodiment of the present disclosure.

FIG. 4 is a block diagram illustrating the image processor 200 illustrated in FIG. 1, in accordance with an embodiment of the present disclosure. For convenience in description, FIG. 4 illustrates only a component related to a group of kernel image values 5X5V1, 5X5V2, 5X5V3 and 5X5V4 corresponding to one group among the image values DPXs.

Referring to FIG. 4, the image processor 200 may include first to fourth defect detectors 211, 213, 215 and 217, a defect scheduler 220, a defect corrector 230 and first to fourth selectors 241, 243, 245 and 247.

The first defect detector 211 may detect whether a first target image value is defective based on the first kernel image value 5X5V1 including the first target image value and generate first detection information DINF1 corresponding to the detection result. The first detection information DINF1 may include a first flag signal F1 indicating whether the first target image value is detected as a defective image value and a first distortion value V1 corresponding to the first target image value. For example, the first defect detector 211 may calculate the first distortion value V1 based on the first target image value and one or more first peripheral image values within the first kernel image value 5X5V1 and generate the first flag signal F1, which corresponds to whether the first target image value is defective, by comparing the first distortion value V1 with a reference value.

The second defect detector 213 may detect whether a second target image value is defective based on the second kernel image value 5X5V2 including the second target image value and generate second detection information DINF2 corresponding to the detection result. The second detection information DINF2 may include a second flag signal F2 indicating whether the second target image value is detected as a defective image value and a second distortion value V2 corresponding to the second target image value. For example, the second defect detector 213 may calculate the second distortion value V2 based on the second target image value and one or more second peripheral image values within the second kernel image value 5X5V2 and generate the second flag signal F2, which corresponds to whether the second target image value is defective, by comparing the second distortion value V2 with the reference value.

The third defect detector 215 may detect whether a third target image value is defective, based on the third kernel image value 5X5V3 including the third target image value and generate third detection information DINF3 corresponding to the detection result. The third detection information DINF3 may include a third flag signal F3 indicating whether the third target image value is detected as a defective image value and a third distortion value V3 corresponding to the third target image value. For example, the third defect detector 215 may calculate the third distortion value V3 based on the third target image value and one or more third peripheral image values within the third kernel image value 5X5V3, and generate the third flag signal F3, which corresponds to whether the third target image value is defective, by comparing the third distortion value V3 with the reference value.

The fourth defect detector 217 may detect whether a fourth target image value is defective based on the fourth kernel image value 5X5V4 including the fourth target image value, and generate fourth detection information DINF4 corresponding to the detection result. The fourth detection information DINF4 may include a fourth flag signal F4 indicating whether the fourth target image value is detected as a defective image value and a fourth distortion value V4 corresponding to the fourth target image value. For example, the fourth defect detector 217 may calculate the fourth distortion value V4 based on the fourth target image value and one or more fourth peripheral image values within the fourth kernel image value 5X5V4 and generate the fourth flag signal F4, which corresponds to whether the fourth target image value is defective, by comparing the fourth distortion value V4 with the reference value.

The defect scheduler 220 may sequentially output, based on the first to fourth detection information DINF1, DINF2, DINF3 and DINF4, defective kernel image values 5X5V including one or more defective image values in which a defect occurs among the first to fourth target image values. For example, the defect scheduler 220 may determine a priority of the one or more defective image values based on the first to fourth detection information DINF1, DINF2, DINF3 and DINF4, and sequentially select and output the defective kernel image values 5X5V according to priorities.

The defect corrector 230 may correct the one or more defective image values within the defective kernel image values 5X5V and generate at least one of first to fourth corrected image values CV1, CV2, CV3 and CV4, For example, the defect corrector 230 may generate at least one of the first to fourth corrected image values CV1, CV2, CV3 and CV4 based on the respective defective image values and the peripheral image values of the respective defective image values within the respective kernel image values 5X5V.

The first selector 241 may select and output one of the first target image value TV1 and the first corrected image value CV1 based on the first flag signal F1.

The second selector 243 may select and output one of the second target image value TV2 and the second corrected image value CV2 based on the second flag signal F2.

The third selector 245 may select and output one of the third target image value TV3 and the third corrected image value CV3 based on the third flag signal F3.

Figure 5:
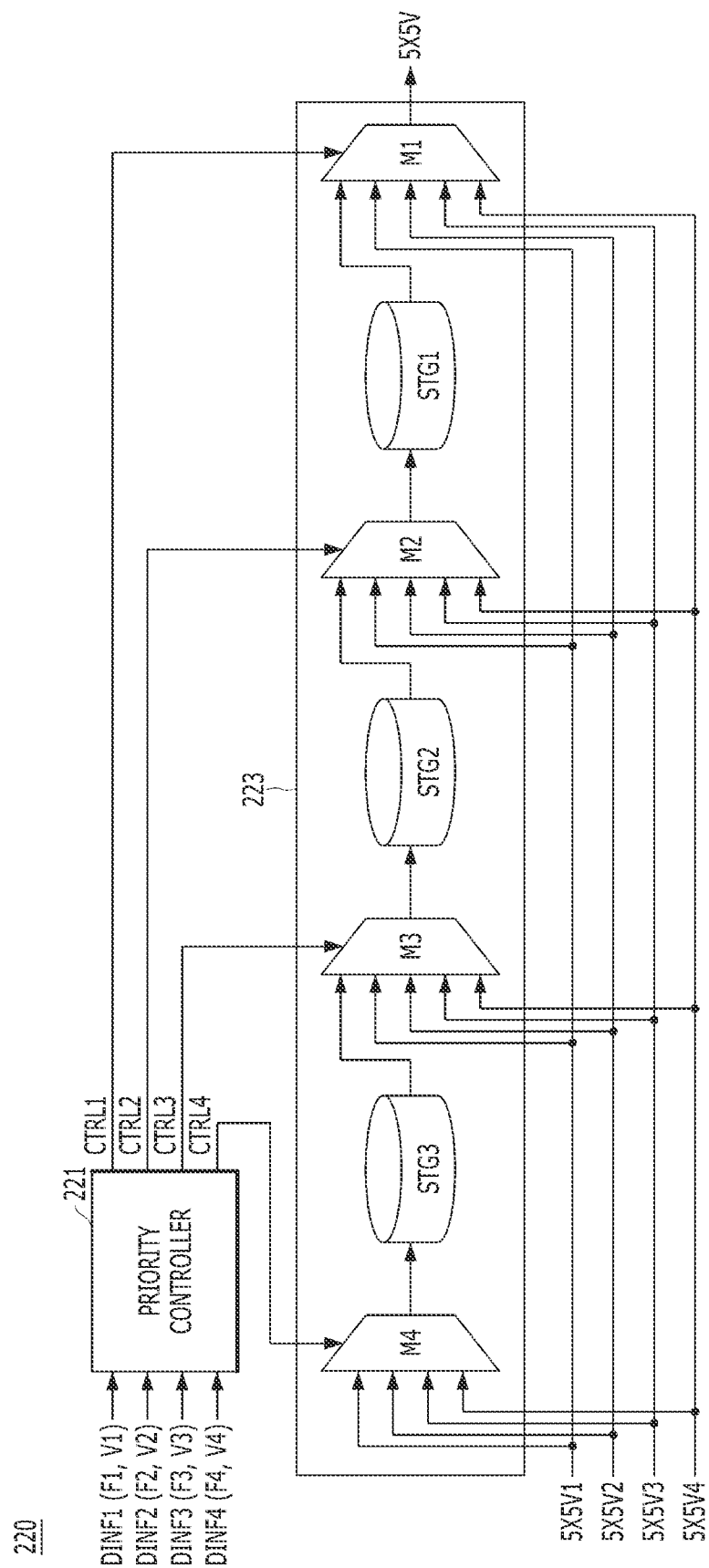
FIG. 5 is a block diagram illustrating a defect scheduler illustrated in FIG. 4, in accordance with an embodiment of the present disclosure.

The fourth selector 247 may select and output one of the fourth target image value TV4 and the fourth corrected image value CV4 based on the fourth flag signal F4, FIG. 5 is a block diagram illustrating the defect scheduler 220 illustrated in FIG. 4, in accordance with an embodiment of the present disclosure.

Referring to FIG. 5, the defect scheduler 220 may include a priority controller 221 and an output unit 223.

The priority controller 221 may determine the priorities of the one or more defective image values based on the first to fourth detection information DINF1, DINF2, DINF3 and DINF4, and generate first to fourth control signals CRL1, CTRL2, CTRL3 and CTRL4 corresponding to the priorities.

The output unit 223 may sequentially output the one or more defective image values based on the first to fourth control signals CTRL1, CRTL2, CTRL3 and CTRL4 in which the priorities are reflected. For example, the output unit 223 may include first to fourth selection circuits M1, M2, M3 and M4 and first to third buffer circuits STG1, STG2 and STG3.

The first selection circuit M1 may select and output defective kernel image values including a defective image value corresponding to a first priority, based on the first control signal CTRL1.

The second selection circuit M2 may select and output defective kernel image values including a defective image value corresponding to a second priority, based on the second control signal CTRL2.

The third selection circuit M3 may select and output defective kernel image values including a defective image value corresponding to a third priority, based on the third control signal CTRL3.

The fourth selection circuit M4 may select and output defective kernel image values including a defective image value corresponding to a fourth priority, based on the fourth control signal CTRL4.

The first buffer circuit STG1 may store the defective kernel image values including the defective image value corresponding to the second priority.

The second buffer circuit STG2 may store the defective kernel image values including the defective image value corresponding to the third priority.

The third buffer circuit STG3 may store the defective kernel image values including the defective image value corresponding to the fourth priority.

In the present embodiment, an example that the first to third buffer circuits STG1, STG2 and STG3 are configured in relation to the image values 5X5V1, 5X5V2, 5X5V3 and 5X5V4 corresponding to the one group, has been described. However, the number of buffer circuits STG is not necessarily limited thereto and may be changed according to design. For example, the number of buffer circuits STG may be determined according to a probability that the number of defective image values is equal to or greater than the number of the defect correctors 230, According to an example, a probability ND Prob, that the number of defective image values is equal to or greater than the number of the defect correctors 230 may be defined by the following "Equation 1".

$$ND\ Prob. = \sum_{n=t+1}^{s} \{sC_n \times p^n \times (1-p)^{s-n}\}, (t \leq s) \quad \text{[Equation 1]}$$

Herein, "n" may refer to the number of defective image values generated at the same time, "t" may refer to the number of the defect correctors 230, "s" may refer to the number of kernels processed at the same time, "c" may refer to a combination, "$p^n$" may refer to a probability that n target image values are defective, and "$(1-p)^{s-n}$" may refer to a probability that s-n target image values are not defective.

According to another example, when a phase detection autofocus (PDAF) pixel is included in the pixel array 110, a probability PD Prob. that the number of defective image values is equal to or greater than the number of the defect correctors 230 may be defined by the following "Equation 2". An image value of the phase detection autofocus pixel may be regarded as the same as a defective image value.

$$PD\ Prob. = \sum_{n=t+1-a}^{s-a} \{_{s-a}C_n \times p^n \times (1-p)^{s-n-a}\} \quad \text{[Equation 2]}$$

Herein, "n" may refer to the number of defective image values generated at the same time, "t" may refer to the number of the defect correctors 230, "a" may refer to the number of image values of the phase detection autofocus pixel among image values for each group, "s" may refer to the number of kernels processed at the same time, "c" may refer to a combination, "$p^n$" may refer to a probability that n target image values are defective, and "$(1-p)^{s-n-a}$" may refer to a probability that s-n-a target image values are not defective.

Figure 6:
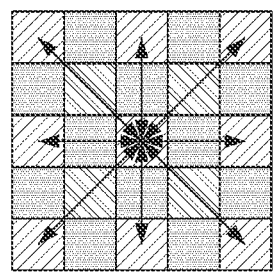
FIG. 6 is a diagram illustrating a method for calculating a distortion value in accordance with an embodiment of the present disclosure.

FIG. 6 is a diagram illustrating a method for calculating a distortion value in accordance with an embodiment of the present disclosure.

Referring to FIG. 6, the distortion value of a target image value may be a sum of differences between the target image value and the peripheral image values of the target image value. For example, the distortion value may be defined by the following "Equation 3".

$$V = |PV1-TV|+|PV2-TV|+|PV3-TV|+|PV4-TV|+ \\ |PV5-TV|+|PV6-TV|+|PV7-TV|+|PV8-TV| \quad \text{[Equation 3]}$$

Herein, "V" may refer to the distortion value, "TV" may refer to the target image value, and "PV1" to "PV8" may refer to first to eighth peripheral image values, respectively.

Hereinafter, an operation of the image sensing device 10 in accordance with an embodiment, which has the above-described configuration, is described.

FIG. 7 is a diagram illustrating the operation of the image sensing device 10 illustrated in FIG. 1, in accordance with an embodiment of the present disclosure. FIGS. 8 to 16 are diagrams additionally illustrating the operation of the image sensing device 10 illustrated in FIG. 7, in accordance with an embodiment of the present disclosure.

Referring to FIG. 7, the first to fourth target image values TV1, TV2, TV3 and TV4 may be periodically inputted according to a clock signal. For example, the first to fourth target image values TV1, TV2, TV3 and TV4 may be inputted according to first to ninth periods #1 Clk to #9 Clk of the clock signal.

Figure 8:
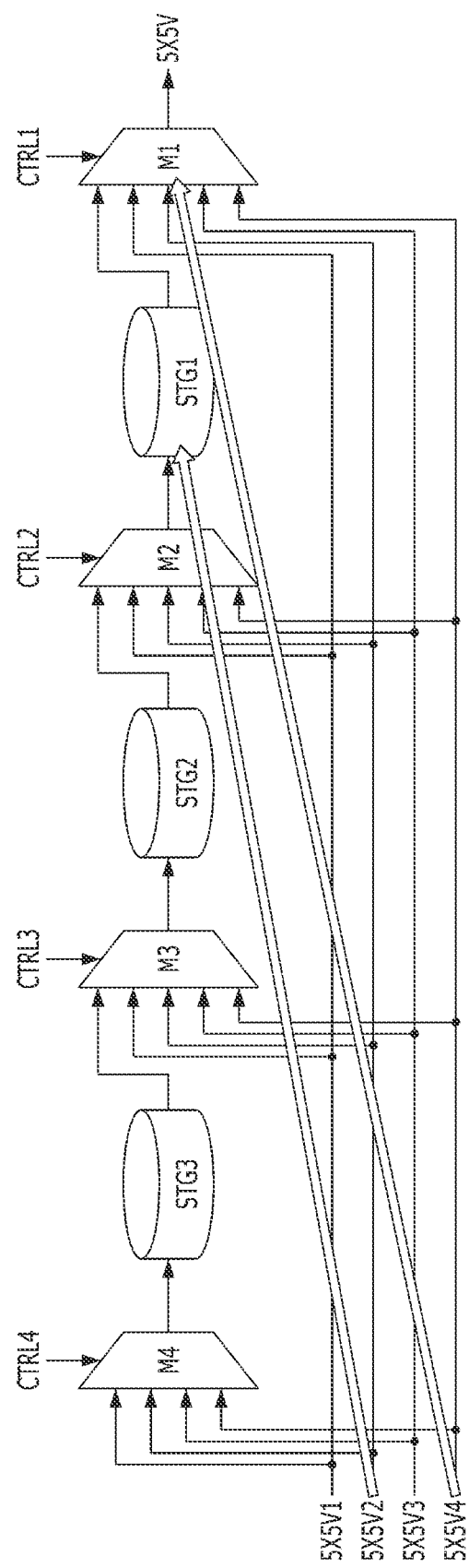
FIGS. 8 to 16 are diagrams additionally illustrating the operation of the image sensing device 10 illustrated in FIG. 7, in accordance with an embodiment of the present disclosure.

Referring to FIGS. 7 and 8, the second and fourth target image values TV2 and TV4 among the first to fourth target image values TV1, TV2, TV3 and TV4 inputted according to the first period #1 Clk of the clock signal are defective image values, and a distortion value corresponding to the fourth target image value TV4 is greater than a distortion value corresponding to the second target image value TV2, The image processor 200 may give priority to the fourth target image value TV4 of the second and fourth target image values TV2 and TV4. The image processor 200 may output the fourth target image value TV4 from the output circuit 223 to the defect corrector 230 to correct the fourth target image value TV4 having a high priority between the second and fourth target image values TV2 and TV4 and generate the fourth target image value TV4 as the fourth corrected image value CV4. The image processor 200 may store the second target image value TV2 having a low priority between the second and fourth target image values TV2 and TV4 in the first buffer circuit STG1.

Figure 9:
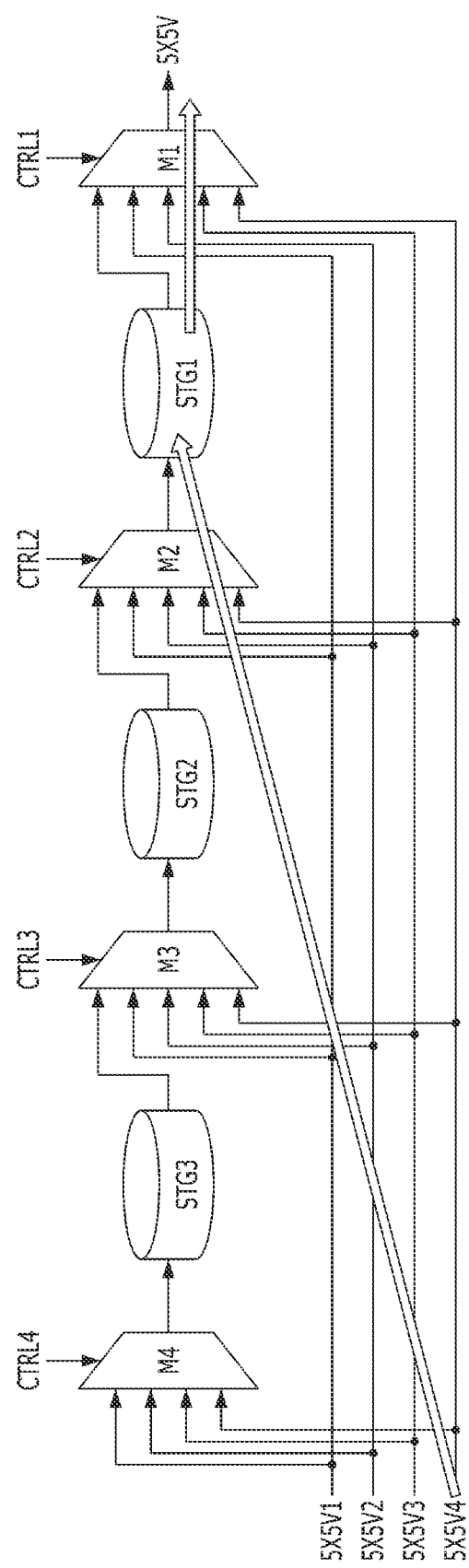

Referring to FIGS. 7 and 9, the fourth target image value TV4 among the first to fourth target image values TV1, TV2, TV3 and TV4 inputted according to the second period #2 Clk of the clock signal is a defective image value. The image processor 200 may output the second target image value TV2 from the output circuit 223 to the defect corrector 230 to correct the second target image value TV2 previously stored in the first buffer circuit STG1, and store the fourth target image value TV4, which is currently inputted, in the first buffer circuit STG1.

Figure 10:
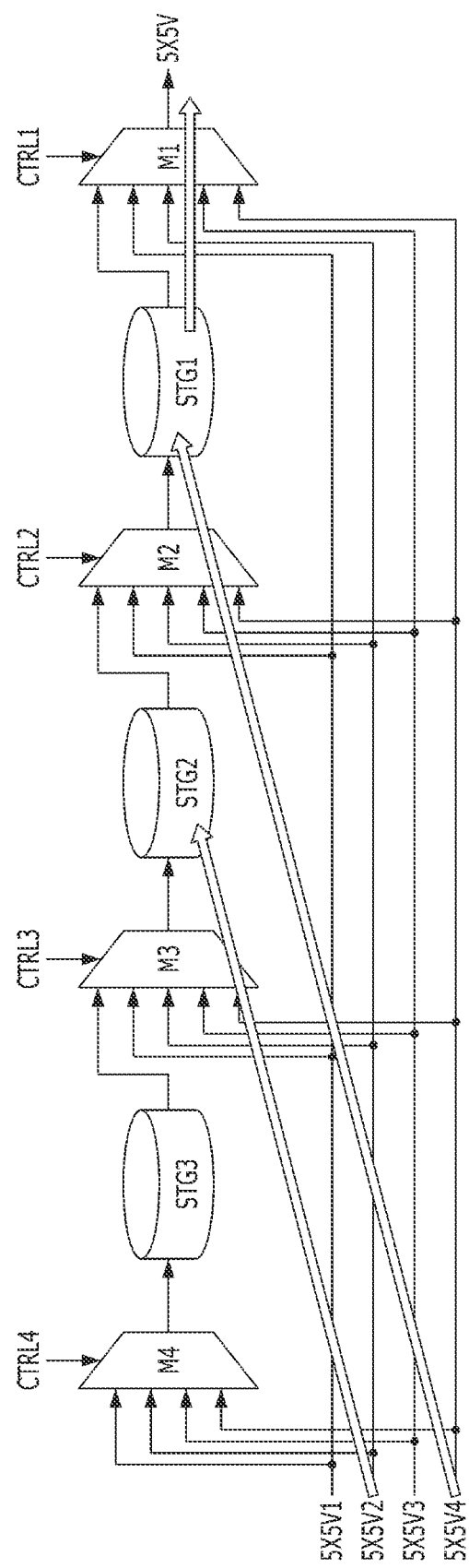

Referring to FIGS. 7 and 10, the second and fourth target image values TV2 and TV4 among the first to fourth target image values TV1, TV2, TV3 and TV4 inputted according to the third period #3 Clk of the clock signal are defective image values, and a distortion value corresponding to the fourth target image value TV4 is greater than a distortion value corresponding to the second target image value TV2. The image processor 200 may give priority to the fourth target image value TV4 of the second and fourth target image values TV2 and TV4. The image processor 200 may output the fourth target image value TV4 from the output circuit 223 to the defect corrector 230 to correct the fourth target image value TV4 previously stored in the first buffer circuit STG1, store the fourth target image value TV4 having a high priority between the second and fourth target image values TV2 and TV4, which are currently inputted, in the first buffer circuit STG1, and store the second target image value TV2 having a low priority in the second buffer circuit STG2.

Figure 11:
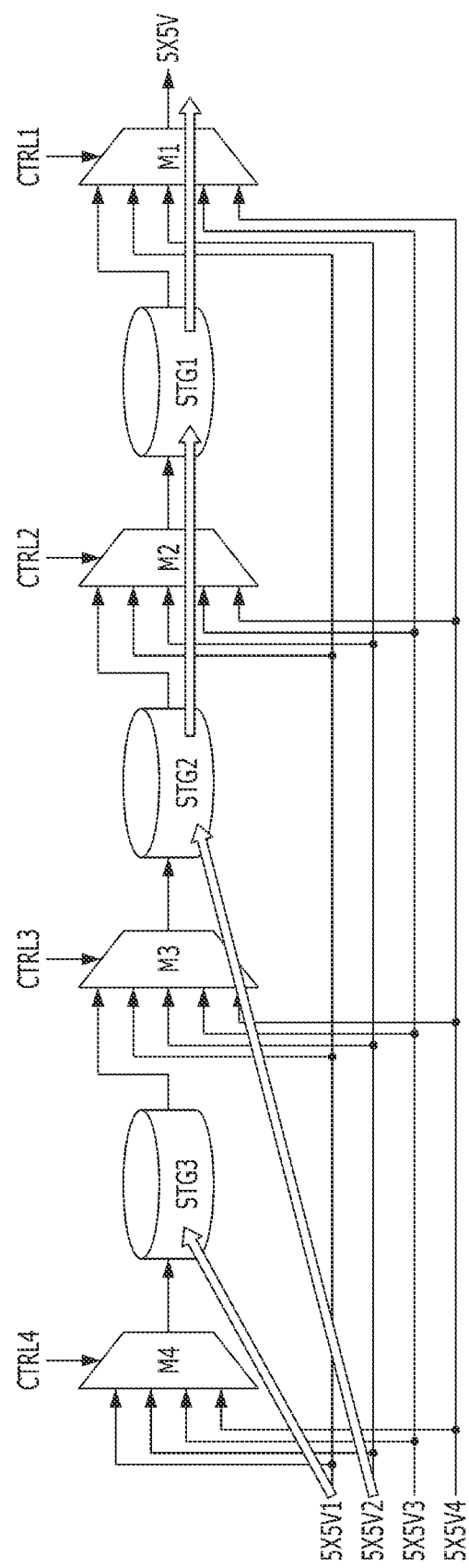

Referring to FIGS. 7 and 11, the first, second and fourth target image values TV1, TV2 and TV4 among the first to fourth target image values TV1, TV2, TV3 and TV4 inputted according to the fourth period #4 Clk of the dock signal are defective image values, a distortion value corresponding to the second target image value TV2 among the first, second and fourth target image values TV1, TV2 and TV4 is the largest, and a distortion value corresponding to the fourth target image value TV4 is the smallest. In this case, the image processor 200 may determine the second target image value TV2 among the first, second and fourth target image values TV1, TV2 and TV4 as a first priority, determine the first target image value TV1 as a second priority, and determine the fourth target image value TV4 as a third priority. The image processor 200 may output the fourth target image value TV4 from the output circuit 223 to the defect corrector 230 to correct the fourth target image value TV4 previously stored in the first buffer circuit STG1, and shift the second target image value TV2, which is previously stored in the second buffer circuit STG2, to the first buffer circuit STG1. The image processor 200 may store the second target image value TV2 having the first priority, which is currently inputted, in the second buffer circuit STG2, and store the first target image value TV1 having the second priority, which is currently inputted, in the third buffer circuit STG3. At this time, since the image values have been stored in all of the first to third buffer circuits STG1, STG2 and STG3, the image processor 200 may process the fourth target image value TV4 having the third priority, which is currently inputted, by way of exception. For example, the image processor 200 may ignore a defect in the fourth target image value TV4 having the third priority, which is currently inputted, and process the fourth target image value TV4 as a normal image value.

Figure 12:
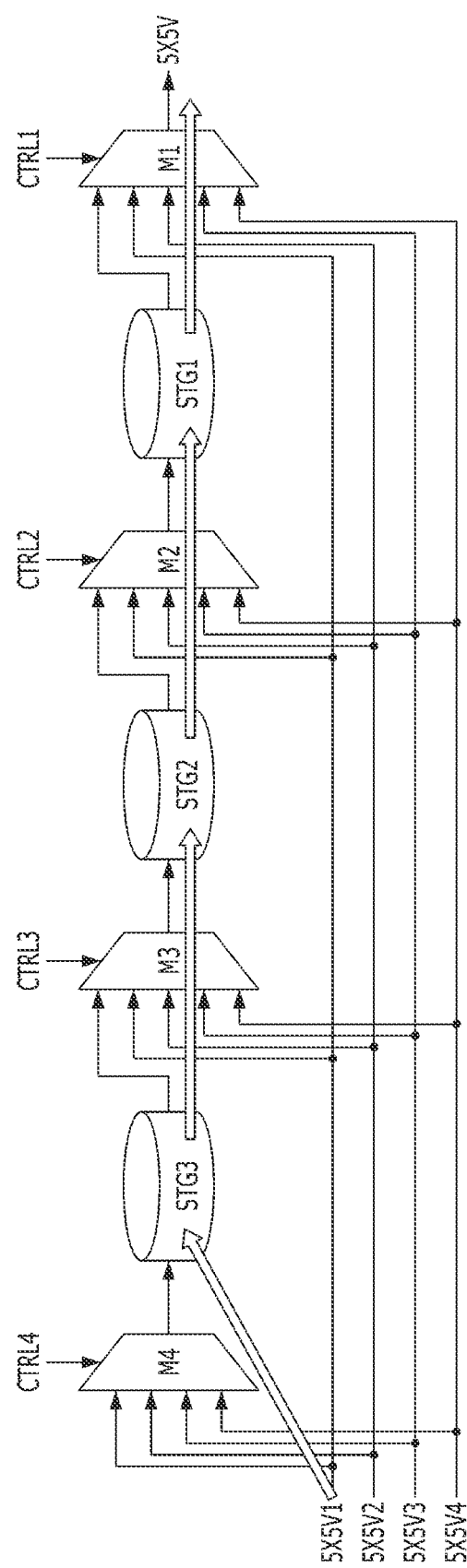

Referring to FIGS. 7 and 12, the first target image value TV1 among the first to fourth target image values TV1, TV2, TV3 and TV4 inputted according to the fifth period #5 Clk of the clock signal is a defective image value. The image processor 200 may output the second target image value TV2 from the output circuit 223 to the defect corrector 230 to correct the second target image value TV2 previously stored in the first buffer circuit STG1, shift the second target image value TV2, which is previously stored in the second buffer circuit STG2, to the first buffer circuit STG1, and shift the first target image value TV1, which is previously stored in the third buffer circuit STG3, to the second buffer circuit STG2, The image processor 200 may store the first target image value TV1, which is currently inputted, in the third buffer circuit STG3.

Figure 13:
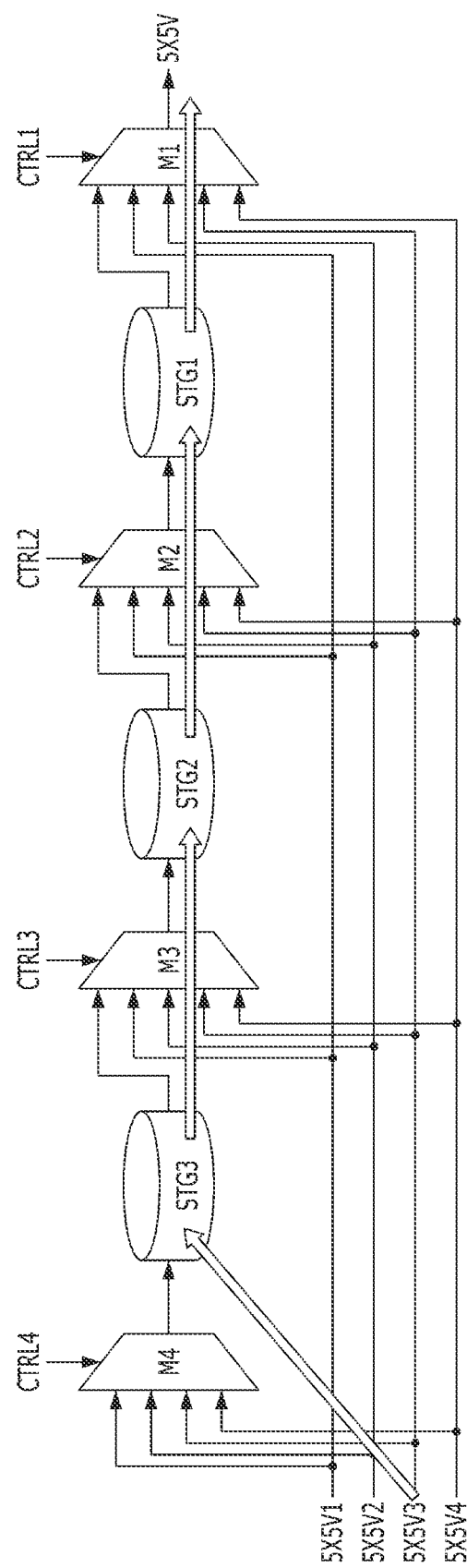
Figure 14:
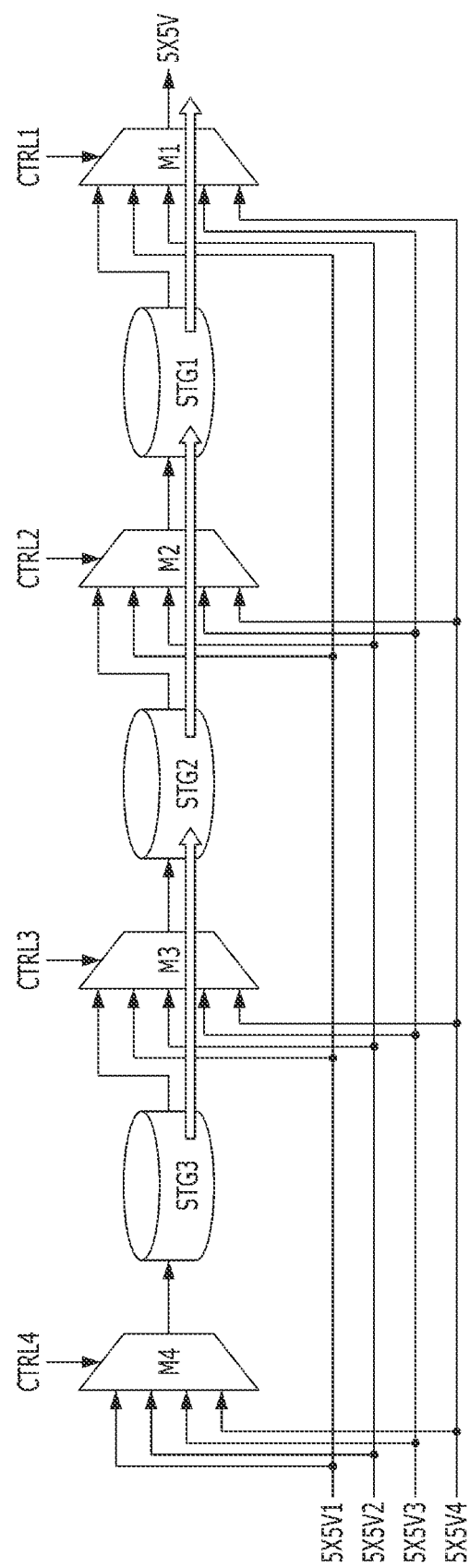
Figure 15:
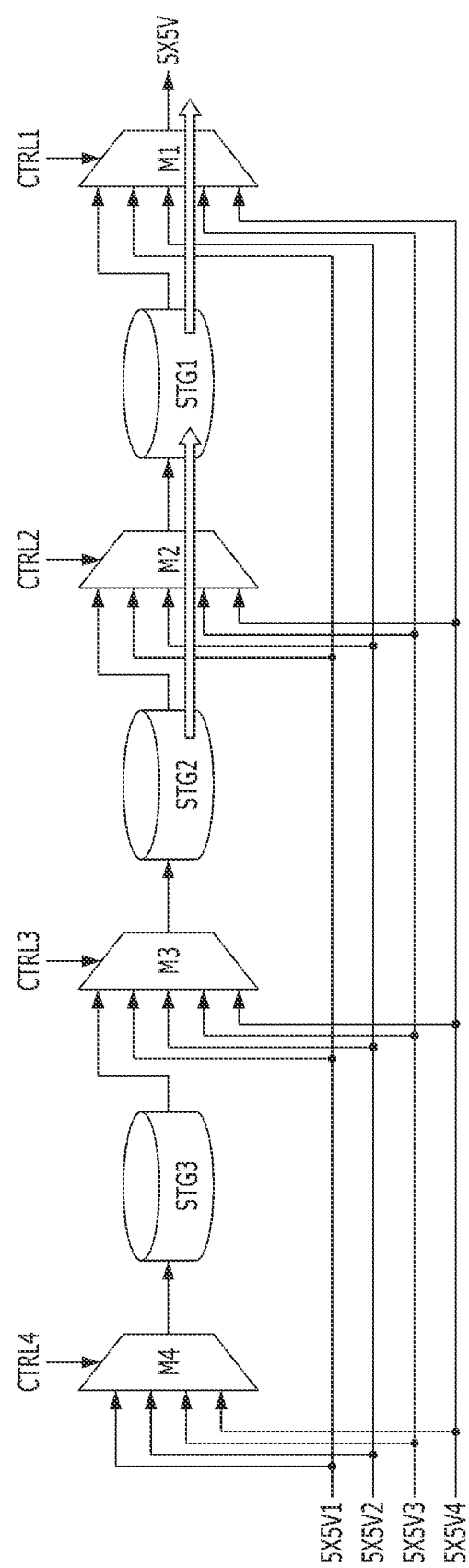
Figure 16:
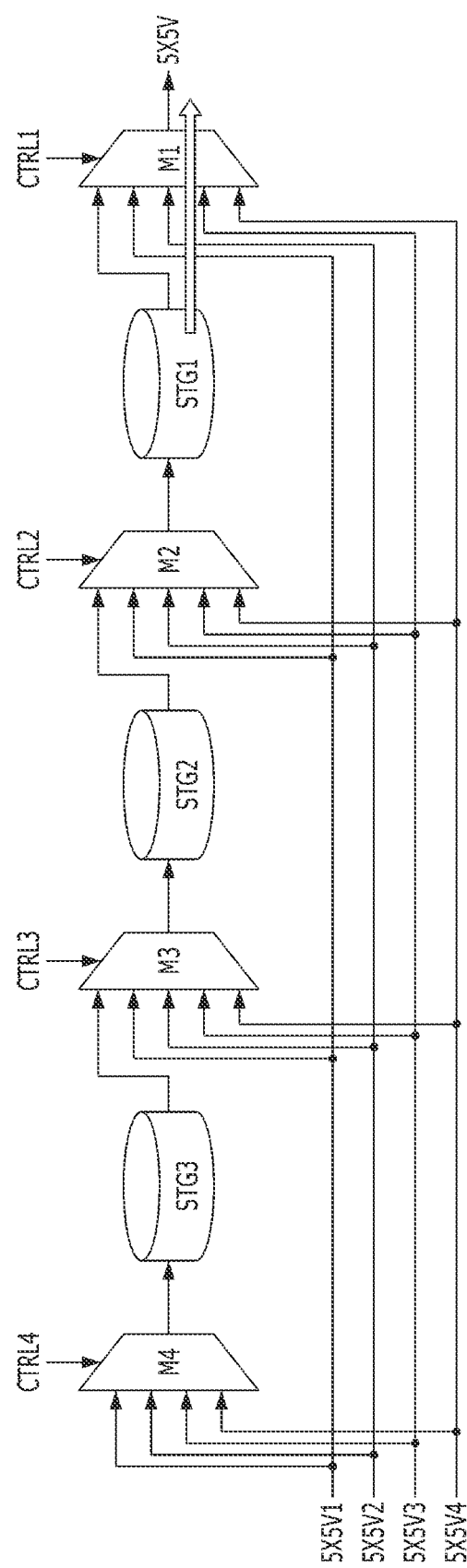

Referring to FIGS. 7 and 13, the third target image value TV3 among the first to fourth target image values TV1, TV2, TV3 and TV4 inputted according to the sixth period #6 Clk of the clock signal is a defective image value. The image processor 200 may output the second target image value TV2 from the output circuit 223 to the defect corrector 230 to correct the second target image value TV2 previously stored in the first buffer circuit STG1, shift the first target image value TV1, which is previously stored in the second buffer circuit STG2, to the first buffer circuit STG1, and shift the first target image value TV1, which is previously stored in the third buffer circuit STG3, to the second buffer circuit STG2. The image processor 200 may store the third target image value TV3, which is currently inputted, in the third buffer circuit STG3.

Referring to FIGS. 7 and 14 to 16, when any defective image value is not detected during the seventh to ninth periods #7 Clk to #9 Clk of the clock signal, the image processor 200 may sequentially shift and sequentially output the image values, which are previously stored in the first to third buffer circuits STG1, STG2 and STG3, from the output circuit 223 to the defect corrector 230 to correct the sequentially output image values during the seventh to ninth periods #7 Clk to #9 Clk of the clock signal.

Although FIG. 7 illustrates that only the defective image values are stored in the first to third buffer circuits STG1, STG2 and STG3, the kernel image values including the defective image values may be stored therein in actuality.

According to an embodiment of the present disclosure, the defective image values may be processed without affecting the performance of processing the defective image values.

According to an embodiment of the present disclosure, an area of a component for processing defective image values may be minimized without affecting the performance of processing the defective image values.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensing device comprising:
a plurality of defect detectors each suitable for detecting whether a corresponding target image value is defective, and generating detection information corresponding to a result of the detection, wherein the detection information comprises a flag signal indicating whether the corresponding target image value is defective, and a distortion value of the corresponding target image value;
a defect scheduler suitable for sequentially outputting one or more defective image values, which are the target image values detected as defective among the plurality of target image values, based on the detection information; and
a defect corrector suitable for correcting the output defective image values.

2. The image sensing device of claim 1, wherein the defect scheduler sequentially outputs the defective image values by:
determining priorities based on the detection information, and
sequentially selecting the defective image values according to the priorities.

3. The image sensing device of claim 1, wherein the distortion value is a sum of differences between the corresponding target image value and peripheral image values of the corresponding target image value.

4. The image sensing device of claim 1, wherein each of the defect detectors detects whether the corresponding target image value is defective by:
calculating the distortion value based on the corresponding target image value and peripheral image values of the corresponding target image value, and
comparing the distortion value with a reference value.

5. The image sensing device of claim 1, wherein the defect corrector corrects the output defective image values by generating corrected image values respectively corresponding to the output defective image values based on the respective output defective image values and peripheral image values of the respective output defective image values.

6. The image sensing device of claim 1, further comprising a plurality of selectors each suitable for selectively outputting one of the corresponding target image values and the corrected image value based on a flag signal included in the detection information.

7. An image sensing device comprising:
- a plurality of defect detectors each suitable for detecting whether a corresponding target image value is defective, and detection information corresponding to a result of the detection;
- a priority controller suitable for determining priorities of one or more defective image values, which are the target image values detected as defective among the plurality of target image values, and generating a plurality of control signals corresponding to the priorities based on the detection information;
- an output unit suitable for sequentially outputting the defective image values according to the priorities based on the plurality of control signals; and
- a defect corrector suitable for correcting the output defective image values wherein each of the defect detectors detects whether the corresponding target image value is defective by:
- calculating a distortion value based on the corresponding target image value and peripheral image values of the corresponding target image value, and
- comparing the distortion value with a reference value.

8. The image sensing device of claim 7, wherein the detection information comprises a flag signal indicating whether the corresponding target image value is defective, and a distortion value of the corresponding target image value.

9. The image sensing device of claim 8, wherein the distortion value is a sum of differences between the corresponding target image value and peripheral image values of the corresponding target image value.

10. The image sensing device of claim 7, wherein the output unit comprises:
- a plurality of selection circuits suitable for selecting the defective image values according to the priorities; and
- at least one buffer circuit suitable for storing at least one defective image value having a second priority or lower among the defective image values.

11. The image sensing device of claim 7, wherein the defect corrector corrects the output defective image values by generating corrected image values respectively corresponding to the output defective image values based on the respective output defective image values and peripheral image values of the respective output defective image values.

12. The image sensing device of claim 7, further comprising a plurality of selectors each suitable for selectively outputting one of the corresponding target image values and the corrected image value based on a flag signal included in the detection information.

13. An image sensing device comprising:
- an image sensor including a plurality of pixels arranged at intersections of a plurality of rows and a plurality of columns, and suitable for generating target image values corresponding to pixel signals which are read out from the plurality of pixels; and
- an image processor suitable for dividing the target image values into a plurality of groups, sequentially selecting and correcting, according to priorities, one or more defective image values among the target image values for each group, and determining the priorities according to distortion values corresponding to the respective defective image values.

14. The image sensing device of claim 13, wherein each of the plurality of distortion values is a sum of differences between a corresponding defective image value and peripheral image values of the corresponding defective image value.

15. An operating method of an image processor, the operating method comprising:
- receiving, at each clock, a group of kernel image values each including a target image value and peripheral image values;
- calculating, for each of the kernel image values, a distortion degree based on the target image value and the peripheral image values;
- detecting, for each of the kernel image values, the target image value as a defective image value based on the distortion degree;
- queueing in the one or more kernel image values having the defective image values within the group in a descending order of the distortion degree; and
- queueing out the queued-in kernel image values on a first-in-first-out (FIFO) basis to correct the defective image value.

* * * * *